United States Patent
Hayakawa (10) Patent No.: US 11,881,894 B2
(45) Date of Patent: Jan. 23, 2024

(54) OPTICAL COMMUNICATION DEVICE

(71) Applicant: Mitsubishi Electric Corporation, Tokyo (JP)

(72) Inventor: Ryo Hayakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 44 days.

(21) Appl. No.: 17/793,412

(22) PCT Filed: Mar. 12, 2020

(86) PCT No.: PCT/JP2020/010783
§ 371 (c)(1),
(2) Date: Jul. 18, 2022

(87) PCT Pub. No.: WO2021/181601
PCT Pub. Date: Sep. 16, 2021

(65) Prior Publication Data
US 2023/0044806 A1  Feb. 9, 2023

(51) Int. Cl.
*H04B 10/27* (2013.01)
*H04B 10/2575* (2013.01)
*H04J 14/02* (2006.01)

(52) U.S. Cl.
CPC ....... *H04B 10/27* (2013.01); *H04B 10/25759* (2013.01); *H04J 14/02* (2013.01)

(58) Field of Classification Search
CPC .... H04B 10/27; H04B 10/25759; H04J 14/02
(Continued)

(56) References Cited

U.S. PATENT DOCUMENTS

| | | | |
|---|---|---|---|
| 8,503,891 B2 * | 8/2013 | Mashimo | H04B 10/272 398/58 |
| 2007/0031148 A1 * | 2/2007 | Li | H04J 3/1611 398/79 |

(Continued)

FOREIGN PATENT DOCUMENTS

| | | |
|---|---|---|
| JP | 2012-104961 A | 5/2012 |
| JP | 2013-168746 A | 8/2013 |

(Continued)

OTHER PUBLICATIONS

International Search Report and Written Opinion dated May 26, 2020, received for PCT Application PCT/JP2020/010783, filed on Mar. 12, 2020, 8 pages including English Translation.

*Primary Examiner* — Dalzid E Singh
(74) *Attorney, Agent, or Firm* — XSENSUS LLP (57) ABSTRACT

An optical communication device includes a WDM optical transmission reception unit that receives an optical signal and converts the optical signal to an electric signal, a MUX/DEMUX unit that converts the electric signal obtained by the conversion to a plurality of electric signals, signal detection units, a switch unit that changes paths, client IF units, and a control unit. A first signal detection unit among the signal detection units detects a first electric signal among the plurality of electric signals. When the first electric signal is a signal to be processed based on a first communication standard, the control unit controls the switch unit so that the first electric signal is inputted to a client IF unit that executes a process based on the first communication standard among the client IF units.

5 Claims, 8 Drawing Sheets

(58) Field of Classification Search
USPC .......................................................... 398/58
See application file for complete search history.

(56) References Cited

U.S. PATENT DOCUMENTS

| | | | | |
|---|---|---|---|---|
| 2009/0016719 A1* | 1/2009 | Lee | ................... | H04J 3/0685 |
| | | | | 398/58 |
| 2015/0043904 A1* | 2/2015 | Boduch | ............... | H04B 10/038 |
| | | | | 398/2 |
| 2021/0321178 A1* | 10/2021 | Araya | ................ | H04J 14/0221 |

FOREIGN PATENT DOCUMENTS

| | | |
|---|---|---|
| JP | 5950606 B2 | 7/2016 |
| WO | 2019/176928 A1 | 9/2019 |

\* cited by examiner

191 CONVERSION TABLE

| CLIENT TYPE | PORT NUMBER | | | | | | | | | |
|---|---|---|---|---|---|---|---|---|---|---|
| | 1 | 2 | 3 | 4 | 5 | 6 | 7 | 8 | 9 | 10 |
| 1GbE | 1001 | 1002 | 1003 | 1004 | 1005 | 1006 | 1007 | 1008 | 1009 | 100A |
| 10GbE | 1101 | 1102 | 1103 | 1104 | 1105 | 1106 | 1107 | 1108 | 1109 | 110A |
| 100GbE | 1201 | 1202 | 1203 | 1204 | 1205 | 1206 | 1207 | 1208 | 1209 | 120A |
| RESERVE | — | — | — | — | — | — | — | — | — | — |
| STM-16 | 2001 | 2002 | 2003 | 2004 | 2005 | 2006 | 2007 | 2008 | 2009 | 200A |
| STM-64 | 2101 | 2102 | 2103 | 2104 | 2105 | 2106 | 2107 | 2108 | 2109 | 210A |
| STM-256 | 2201 | 2202 | 2203 | 2204 | 2205 | 2206 | 2207 | 2208 | 2209 | 220A |
| RESERVE | — | — | — | — | — | — | — | — | — | — |
| OTU1 | 3001 | 3002 | 3003 | 3004 | 3005 | 3006 | 3007 | 3008 | 3009 | 300A |
| OTU2 | 3101 | 3102 | 3103 | 3104 | 3105 | 3106 | 3107 | 3108 | 3109 | 310A |
| OTU3 | 3201 | 3202 | 3203 | 3204 | 3205 | 3206 | 3207 | 3208 | 3209 | 320A |
| OTU4 | 3301 | 3302 | 3303 | 3304 | 3305 | 3306 | 3307 | 3308 | 3309 | 330A |
| RESERVE | — | — | — | — | — | — | — | — | — | — |

FIG. 7

OPTICAL COMMUNICATION DEVICE

CROSS-REFERENCE TO RELATED APPLICATION

The present application is based on PCT filing PCT/JP2020/010783, filed Mar. 12, 2020, the entire contents of which are incorporated herein by reference.

TECHNICAL FIELD

The present disclosure relates to an optical communication device.

BACKGROUND ART

Optical communication systems have been known. For example, optical communication systems are described in Patent References 1 and 2.

Conventionally, the optical communication systems are constructed respectively by their vendors. Thus, optical communication devices included in an optical communication system are products from the same vendor. Further, an optical communication device is also formed of products from the same vendor. In recent years, it is desired to flexibly change the configuration of a system and to obtain each device individually. Further, it is desired to construct a system by combining products from different companies together. Furthermore, it is desired that an optical communication device be formed of products from different companies.

PRIOR ART REFERENCE

Patent Reference

Patent Reference 1: Japanese Patent Application Publication No. 2013-168746
Patent Reference 2: WO 2019/176928

SUMMARY OF THE INVENTION

Problem to be Solved by the Invention

As described above, it is desired to combine products from different companies together. When products of different companies are combined together, there are cases where electrical continuity cannot be implemented between products of different companies.

An object of the present disclosure is to implement the electrical continuity.

Means for Solving the Problem

An optical communication device according to an aspect of the present disclosure is provided. The optical communication device includes a reception conversion unit that receives an optical signal and converts the optical signal to an electric signal, a first conversion unit that converts the electric signal obtained by the conversion by the reception conversion unit to a plurality of electric signals, a plurality of signal detection units, a switch unit that changes paths, a plurality of interface units, and a control unit. Each of the plurality of interface units executes a process based on a communication standard having been set. A first signal detection unit among the plurality of signal detection units detects a first electric signal among the plurality of electric signals. When the first electric signal is a signal to be processed based on a first communication standard, the control unit controls the switch unit so that the first electric signal is inputted to a first interface unit that executes a process based on the first communication standard among the plurality of interface units.

Effect of the Invention

According to the present disclosure, the electrical continuity can be implemented.

MODE FOR CARRYING OUT THE INVENTION

Embodiments will be described below with reference to the drawings. The following embodiments are just examples and a variety of modifications are possible within the scope of the present disclosure.

First Embodiment

Figure 1:
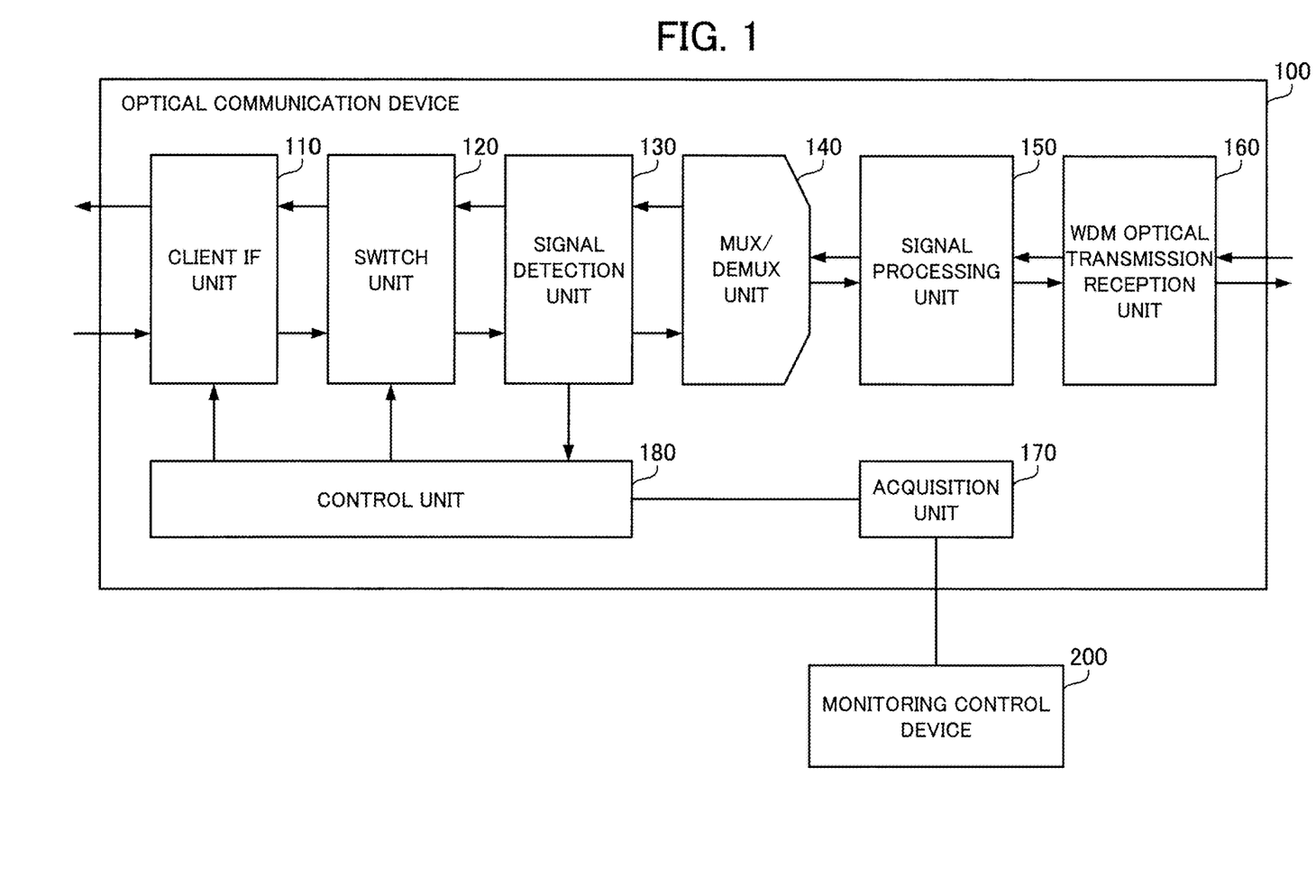
FIG. 1 is a diagram showing an example of an optical communication system in a first embodiment.

FIG. 1 is a diagram showing an optical communication system in a first embodiment. The optical communication system includes an optical communication device 100 and a monitoring control device 200.

The optical communication device 100 may be regarded as a Wavelength Division Multiplexing (WDM) optical communication device. The optical communication device 100 relays client signals. When relaying a client signal, the optical communication device 100 converts a low-speed client signal of Ethernet (registered trademark), Synchronous Digital Hierarchy (SDH) or the like to a high-speed signal suitable for WDM communication.

Incidentally, the client signal is a signal transmitted by a client device communicating with the optical communication device 100. Further, the optical communication device 100 and the client device may communicate with each other via one or more devices.

The optical communication device 100 may be considered to be formed of products from different companies. The optical communication device 100 includes a client interface (IF) unit 110, a switch unit 120, a signal detection unit 130, a MUX/DEMUX unit 140, a signal processing unit 150, a WDM optical transmission reception unit 160, an acquisition unit 170 and a control unit 180.

For example, part or all of the acquisition unit 170 and the control unit 180 may be implemented by a processor or a processing circuitry included in the optical communication device 100. The processing circuitry may be either a single circuit or a combined circuit. Further, part or all of the acquisition unit 170 and the control unit 180 may be implemented as modules of a program executed by the processor included in the optical communication device 100. The program has been recorded in a record medium, for example.

Here, the optical communication device 100 is capable of receiving N client signals. In the case where the optical communication device 100 receives N client signals, the optical communication device 100 includes a plurality of client IF units and a plurality of signal detection units. Here, an example of the plurality of client IF units and the plurality of signal detection units will be described below.

Figure 2:
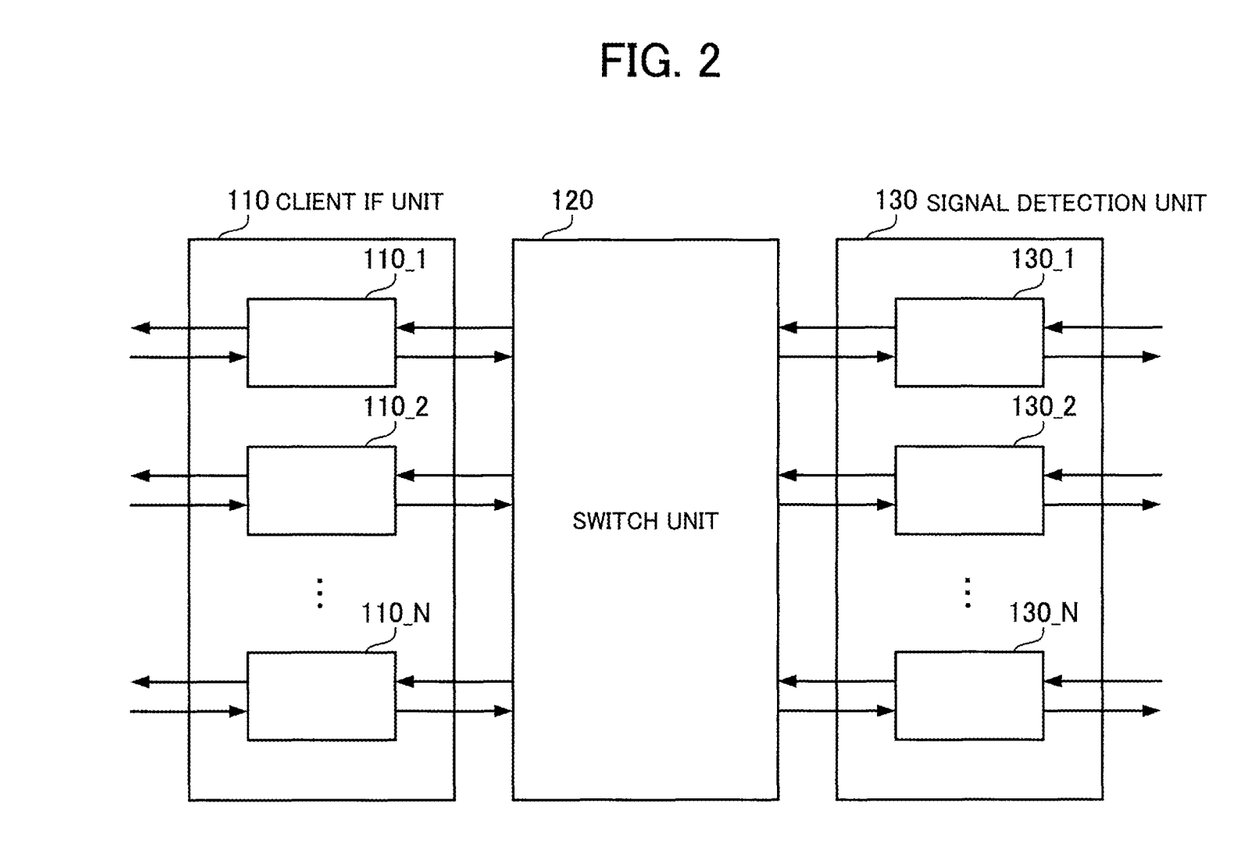
FIG. 2 is a diagram showing a plurality of client IF units and a plurality of signal detection units in the first embodiment.

FIG. 2 is a diagram showing the plurality of client IF units and the plurality of signal detection units in the first embodiment. FIG. 2 shows client IF units 110_1 to 110_N (N=integer greater than or equal to 2) as the plurality of client IF units. Incidentally, the client IF units 110_1 to 110_N are referred to also as a plurality of interface units. Further, FIG. 2 shows signal detection units 130_1 to 130_N as the plurality of signal detection units.

Here, each of the client IF units 110_1 to 110_N and the signal detection units 130_1 to 130_N is referred to as a port. Further, each of the client IF units 110_1 to 110_N and the signal detection units 130_1 to 130_N is referred to by using a port number. For example, "1" is assigned as the port number of the client IF unit 110_1 and the port number of the signal detection unit 130_1.

Furthermore, the client IF units 110_1 to 110_N are collectively referred to as client IF units 110. The signal detection units 130_1 to 130_N are collectively referred to as signal detection units 130.

Each of the client IF units 110_1 to 110_N executes a process based on a client type that has been set by the control unit 180. The client type means a communication standard. For example, the client type is 1GbE, STM-16 or the like.

The client IF units 110_1 to 110_N have an Optical/Electrical (O/E) conversion function. Thus, each client IF unit 110_1-110_N converts a client signal (optical signal) to a client signal (electric signal). The client signal (electric signal) is transmitted to the switch unit 120.

Further, the client IF units 110_1 to 110_N have an E/O conversion function. Thus, each client IF unit 110_1-110_N converts an input client signal (electric signal) to a client signal (optical signal). The client signal (optical signal) is transmitted to the outside of the optical communication device 100. Then, the client signal (optical signal) is inputted to an optical fiber connected to the optical communication device 100.

Incidentally, the number of optical signals transmitted to the outside of the optical communication device 100 and the number of electric signals transmitted from the client IF units 110_1 to 110_N coincide with each other.

The switch unit 120 is a multipath switch that changes paths. The switch unit 120 is capable of changing paths according to the control unit 180. Accordingly, the client signal (electric signal) is inputted to an intended port. Incidentally, in an initial state, the port numbers of the client IF units 110_1 to 110_N and the signal detection units 130_1 to 130_N are set so as to have a correspondence relationship. For example, the port number of the client IF unit 110_1 and the port number of the signal detection unit 130_1 are set so as to have a correspondence relationship. For example, "1" is assigned as the port number of the client IF unit 110_1 and the port number of the signal detection unit 130_1. Accordingly, the client signal (electric signal) transmitted by the client IF unit 110_1 is received by the signal detection unit 130_1.

Next, the signal detection unit will be described below.

Figure 3:
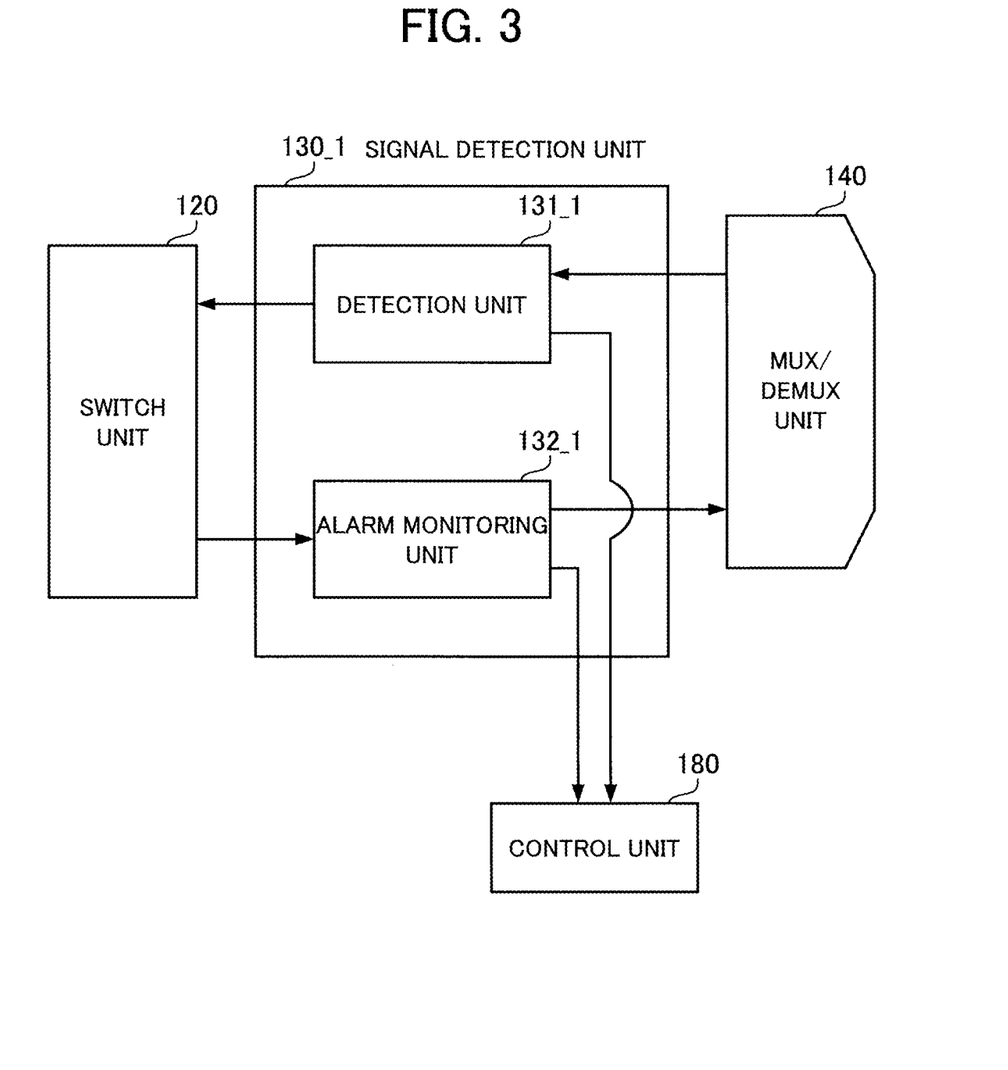
FIG. 3 is a diagram showing functional blocks included in a signal detection unit in the first embodiment.

FIG. 3 is a diagram showing functional blocks included in the signal detection unit in the first embodiment. In FIG. 3, the functional blocks are described by using the signal detection unit 130_1. The signal detection units other than the signal detection unit 130_1 also have the same functional blocks.

The signal detection unit 130_1 includes a detection unit 131_1 and an alarm monitoring unit 132_1.

The detection unit 131_1 detects the client signal (electric signal) transmitted by the MUX/DEMUX unit 140. The function of the detection unit 131_1 will be described later.

The alarm monitoring unit 132_1 monitors whether or not alarm information is included in the client signal (electric signal). When the alarm information is included in the client signal, the alarm monitoring unit 132_1 notifies the control unit 180 of abnormality. With this notification, the control unit 180 is capable of detecting that the abnormality has occurred in the communication between the optical communication device 100 and the client device.

Returning to FIG. 1, the MUX/DEMUX unit 140 will be described below.

The MUX/DEMUX unit 140 converts the N client signals (electric signals) transmitted by the signal detection units 130_1 to 130_N into one electric signal. The MUX/DEMUX unit 140 transmits the converted electric signal to the signal processing unit 150.

Further, the MUX/DEMUX unit 140 converts one electric signal received by the signal processing unit 150 into N client signals (electric signals). Here, the MUX/DEMUX unit 140 is referred to also as a first conversion unit. The MUX/DEMUX unit 140 transmits the N client signals (electric signals) obtained by the conversion to the signal detection units 130_1 to 130_N.

Accordingly, a client signal (electric signal) is inputted to each of the signal detection units 130_1 to 130_N. Then, the detection unit of each signal detection unit 130_1-130_N is capable of detecting the client signal (electric signal).

The signal processing unit 150 performs a predetermined process on the electric signal transmitted by the MUX/DEMUX unit 140. For example, the signal processing unit 150 performs a scramble process, an error correction coding process and a transmission coding process. After these processes are finished, the signal processing unit 150 transmits the electric signal to the WDM optical transmission reception unit 160.

Further, the signal processing unit 150 performs a predetermined process on the electric signal transmitted by the WDM optical transmission reception unit 160. For example, the signal processing unit 150 performs a transmission decoding process, an error correction decoding process and a descramble process. After these processes are finished, the signal processing unit 150 transmits the electric signal to the MUX/DEMUX unit 140.

Incidentally, detailed description of the scramble process, the error correction coding process, the transmission coding process, the transmission decoding process, the error correction decoding process and the descramble process is left out.

The WDM optical transmission reception unit 160 has the E/O conversion function. Specifically, the WDM optical transmission reception unit 160 converts the electric signal transmitted by the signal processing unit 150 into an optical signal. The WDM optical transmission reception unit 160 transmits the optical signal obtained by the conversion to the outside of the optical communication device 100. Accordingly, the optical signal is inputted to an optical fiber connected to the optical communication device 100.

Further, the WDM optical transmission reception unit 160 receives an optical signal via the optical fiber. Here, the WDM optical transmission reception unit 160 is referred to also as a reception conversion unit. The WDM optical transmission reception unit 160 has the O/E conversion function. Specifically, the WDM optical transmission reception unit 160 converts the received optical signal to an electric signal. Incidentally, this electric signal includes a client signal. The WDM optical transmission reception unit 160 transmits the electric signal to the signal processing unit 150.

The acquisition unit 170 acquires setting information. For example, the acquisition unit 170 acquires the setting information from the monitoring control device 200. Here, the setting information may be stored in a storage unit included in the optical communication device 100. Illustration of the storage unit in the drawing is left out. When the setting information has been stored in the storage unit, the acquisition unit 170 acquires the setting information from the storage unit.

Incidentally, the setting information represents a client type to be set to each of the plurality of interface units. In other words, the setting information represents a correspondence relationship between the port numbers of the client IF units 110_1 to 110_N and a client type to be set to each of the client IF units 110_1 to 110_N. For example, the setting information indicates that a client type "1GbE" is to be set to the client IF unit 110_2.

The control unit 180 sets a client type to each of the client IF units 110_1 to 110_N based on the setting information. Accordingly, each of the client IF units 110_1 to 110_N executes a process based on the set client type.

The control unit 180 controls the switch unit 120. The control of the switch unit 120 will be described later.

Next, a process executed by the optical communication device 100 will be described below by using a flowchart.

Figure 4:
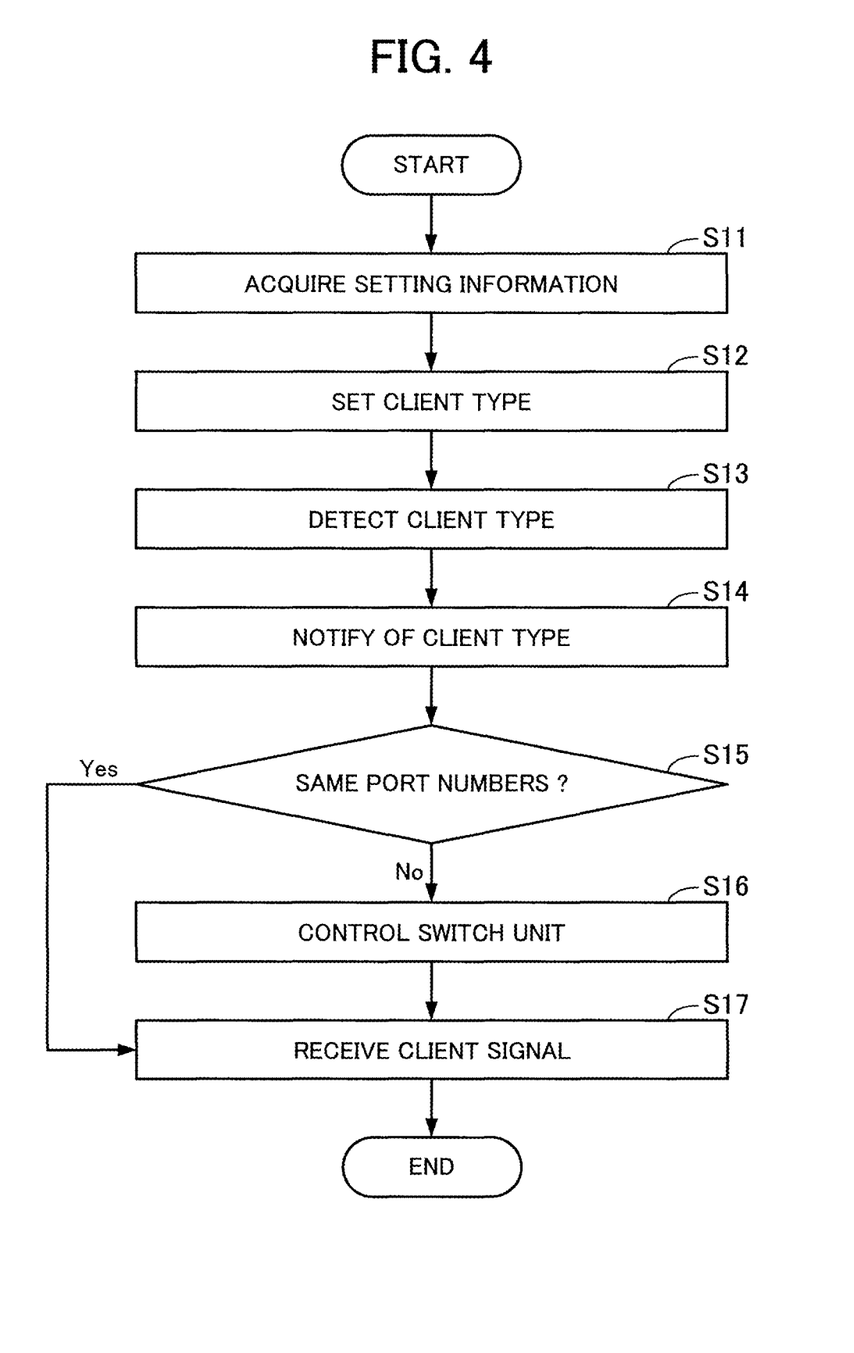
FIG. 4 is a flowchart showing an example of a process executed by an optical communication device in the first embodiment.

FIG. 4 is a flowchart showing an example of the process executed by the optical communication device in the first embodiment. In the description of step S13 and the following steps, an example of a process executed by the signal detection unit 130_1 will be described. The signal detection units other than the signal detection unit 130_1 also execute the same process as the signal detection unit 130_1.

(Step S11) The acquisition unit 170 acquires the setting information from the monitoring control device 200. For example, the setting information indicates a correspondence relationship between the port number of the client IF unit 110_2 and the client type "1GbE".

(Step S12) The control unit 180 sets a client type to each of the client IF units 110_1 to 110_N based on the setting information.

(Step S13) The detection unit 131_1 detects the client signal (electric signal) transmitted by the MUX/DEMUX unit 140. The detection unit 131_1 detects the client type of the client signal (electric signal) based on the format of the client signal (electric signal). In other words, the detection unit 131_1 detects the client type of the client signal (electric signal) based on the format of the client signal (electric signal) as a frame. In a case where the client signal (electric signal) includes the client type, the detection unit 131_1 is capable of detecting the client type of the client signal (electric signal) by extracting the client type from the client signal (electric signal). Incidentally, the detected client type is "1GbE", for example.

(Step S14) The detection unit 131_1 notifies the control unit 180 of the detected client type.

With this notification, the control unit 180 is capable of detecting that the client signal (electric signal) of the detected client type is inputted to the signal detection unit 130_1.

(Step S15) The control unit 180 judges whether the port number of the signal detection unit 130_1 and the port number to which the detected client type has been set are the same as each other or not based on the setting information.

For example, the client type detected by the detection unit 131_1 is "1GbE". The client type that has been set to the client IF unit 110_2 is "1GbE". The port number of the signal detection unit 130_1 is "1". The port number of the client IF unit 110_2 is "2". The control unit 180 judges that the port numbers are different from each other.

When the port numbers are different from each other, the process advances to step S16.

When the port numbers are the same as each other, the client signal (electric signal) inputted to the signal detection unit 130_1 is inputted to the client IF unit 110_1. The client IF unit 110_1 transmits the client signal (optical signal) obtained by the conversion of the client signal (electric signal) to the client device. When abnormality is detected in the communication of the client signal (optical signal), the client device transmits a client signal (optical signal) including the alarm information.

Then, the process advances to step S17.

(Step S16) The control unit 180 controls the switch unit 120 so that the client signal (electric signal) is inputted to the port of the port number to which the detected client type has been set. For example, the control unit 180 controls the switch unit 120 so that the client signal (electric signal) inputted to the signal detection unit 130_1 is inputted to the client IF unit 110_2. By this control, the client signal (electric signal) inputted to the signal detection unit 130_1 is inputted to the client IF unit 110_2. Namely, the optical communication device 100 is capable of implementing the electrical continuity. Then, the client IF unit 110_2 converts the client signal (electric signal) to a client signal (optical signal). The client IF unit 110_2 transmits the client signal (optical signal) to the client device. When abnormality is detected in the communication of the client signal (optical signal), the client device transmits a client signal (optical signal) including the alarm information.

(Step S17) The alarm monitoring unit 132_1 receives the client signal (electric signal) via the client IF unit 110. The alarm monitoring unit 132_1 checks the client signal (electric signal). When the alarm information is included in the client signal (electric signal), the alarm monitoring unit 132_1 notifies the control unit 180 of the abnormality. With this notification, the control unit 180 is capable of detecting that the abnormality has occurred in the communication between the optical communication device 100 and the client device. When no alarm information is included in the client signal (electric signal), the process ends.

As above, when the port numbers are different from each other, the optical communication device 100 executes a process like the following process: The signal detection unit 130_1 among the signal detection units 130_1 to 130_N detects one client signal (electric signal) among the plurality of client signals (electric signals) transmitted by the MUX/DEMUX unit 140. When it is detected by the signal detection unit 130_1 that the detected client signal (electric signal) is a signal to be processed based on the client type "1GbE", the control unit 180 controls the switch unit 120 so that the detected client signal (electric signal) is inputted to the client IF unit 110_2 that executes a process based on the client type "1GbE" among the client IF units 110_1 to 110_N. In other words, when it is detected by the signal detection unit 130_1 that the detected client signal (electric signal) is a signal to be processed based on the client type "1GbE", the control unit 180 controls the switch unit 120 so that the detected client signal (electric signal) is inputted to the client IF unit 110_2 based on the setting information. By this control, the detected client signal (electric signal) is inputted to the client IF unit 110_2. Namely, the signal detection unit 130_1 and the client IF unit 110_2 are electrically connected together via the switch unit 120.

Incidentally, in the above-described example, the detected client signal (electric signal) is referred to also as a first electric signal. The signal detection unit 130_1 is referred to also as a first signal detection unit. The client IF unit 110_2 is referred to also as a first interface unit. The client type "1GbE" is referred to also as a first communication standard.

According to the first embodiment, the optical communication device 100 is capable of implementing the electrical continuity even if the optical communication device 100 is formed of products from different companies. In other words, the optical communication device 100 is capable of automatically implementing the electrical continuity even if the optical communication device 100 is formed of products from different companies.

Second Embodiment

Next, a second embodiment will be described below. In the second embodiment, the description will be given mainly of features different from those in the first embodiment. In the second embodiment, the description is omitted for features in common with the first embodiment. FIGS. 1 to 4 are referred to in the description of the second embodiment.

In the second embodiment, a case where the monitoring control device 200 does not exist will be described. In the second embodiment, it is assumed that ten client signals are inputted to the optical communication device. However, the number of client signals can also be nine or less or eleven or more.

Figure 5:
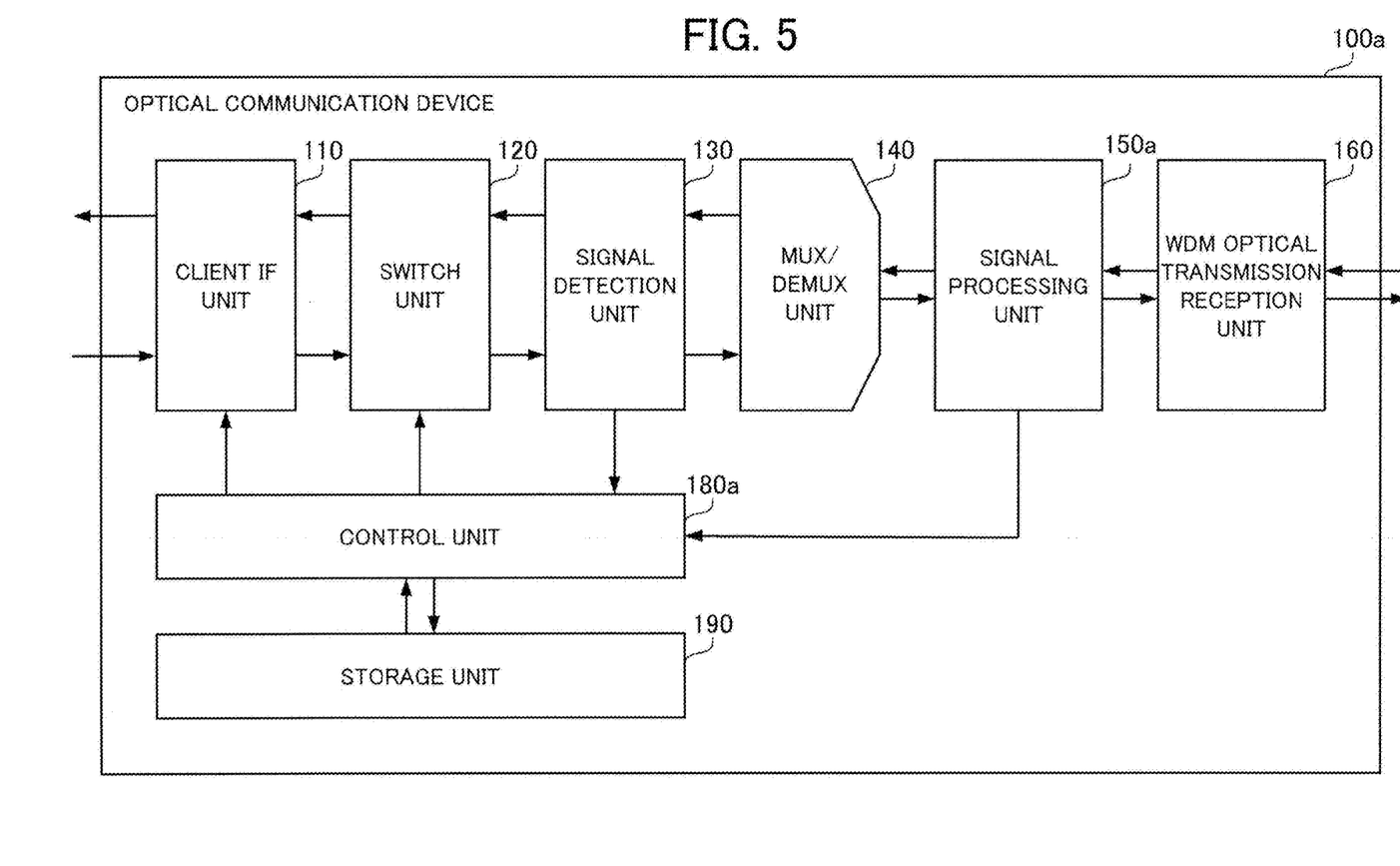
FIG. 5 is a diagram showing functional blocks included in an optical communication device in a second embodiment.

FIG. 5 is a diagram showing functional blocks included in an optical communication device in the second embodiment. Each component in FIG. 5 that is the same as a component shown in FIG. 1 is assigned the same reference character as in FIG. 1.

An optical communication device 100a includes a signal processing unit 150a, a control unit 180a and a storage unit 190. Incidentally, the optical communication device 100a does not include the acquisition unit 170.

The storage unit 190 may also be implemented as a storage area reserved in a volatile memory or nonvolatile memory included in the optical communication device 100a.

The storage unit 190 stores a conversion table. Here, an example of the conversion table will be shown below.

Figure 6:
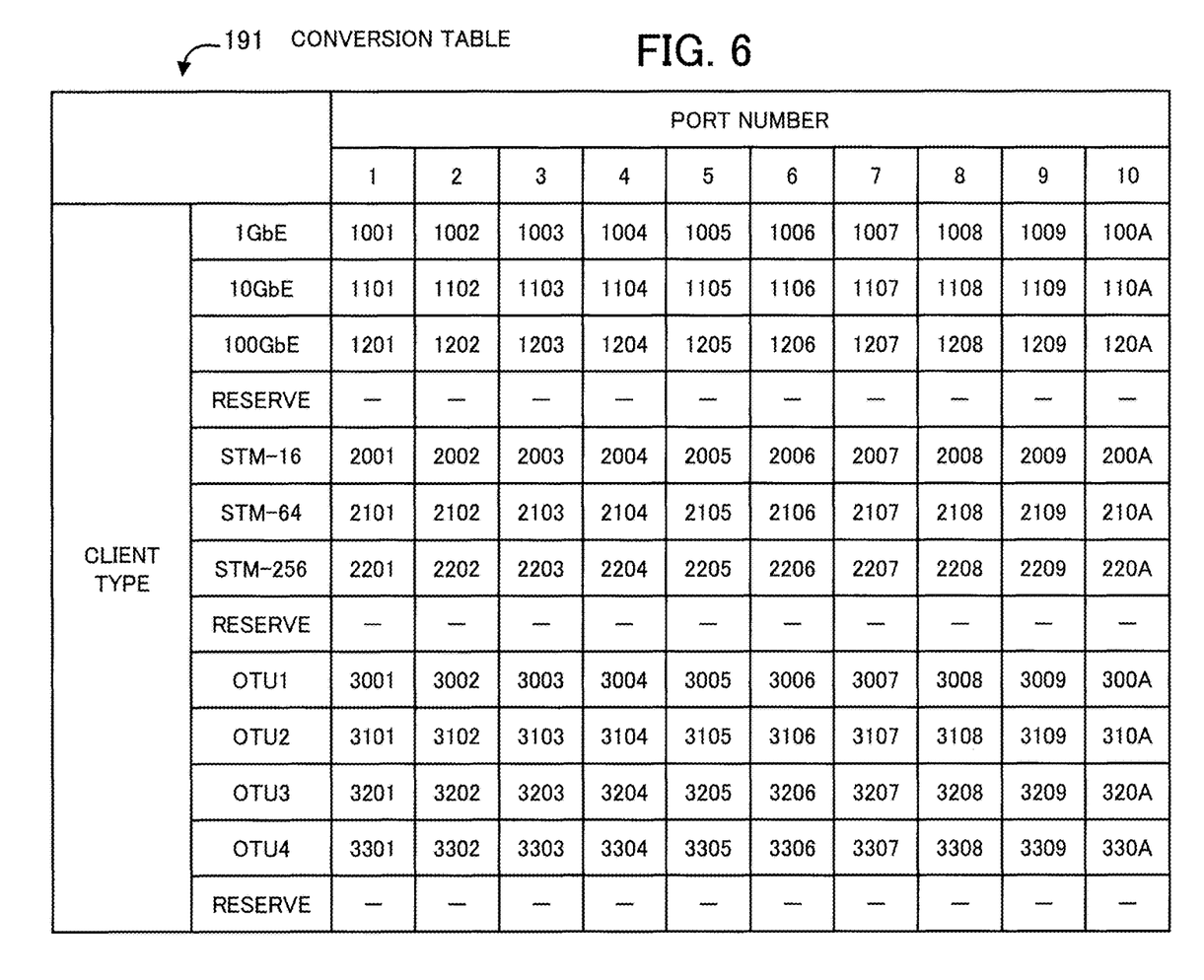
FIG. 6 is a diagram showing an example of a conversion table in the second embodiment.

FIG. 6 is a diagram showing an example of the conversion table in the second embodiment. The conversion table 191 is stored in the storage unit 190. The conversion table 191 is referred to also as conversion information. The conversion table 191 is information for identifying the relationship between a port number and a client type by using an identifier. In other words, the conversion table 191 is information for identifying the relationship between a client IF unit 110 and a client type by using an identifier. For example, the conversion table 191 is information for identifying the relationship between the client IF unit 110_2 and the client type "1GbE" by using an identifier.

Incidentally, the identifier is "1001", "1002" or the like, for example.

The signal processing unit 150a has the function of the signal processing unit 150. Further, the signal processing unit 150a receives a frame including an identifier from the WDM optical transmission reception unit 160. For example, the signal processing unit 150a receives an Optical Transport Network (OTN) frame including an identifier from the WDM optical transmission reception unit 160. Here, an example of the format of the OTN frame will be shown below.

Figure 7:
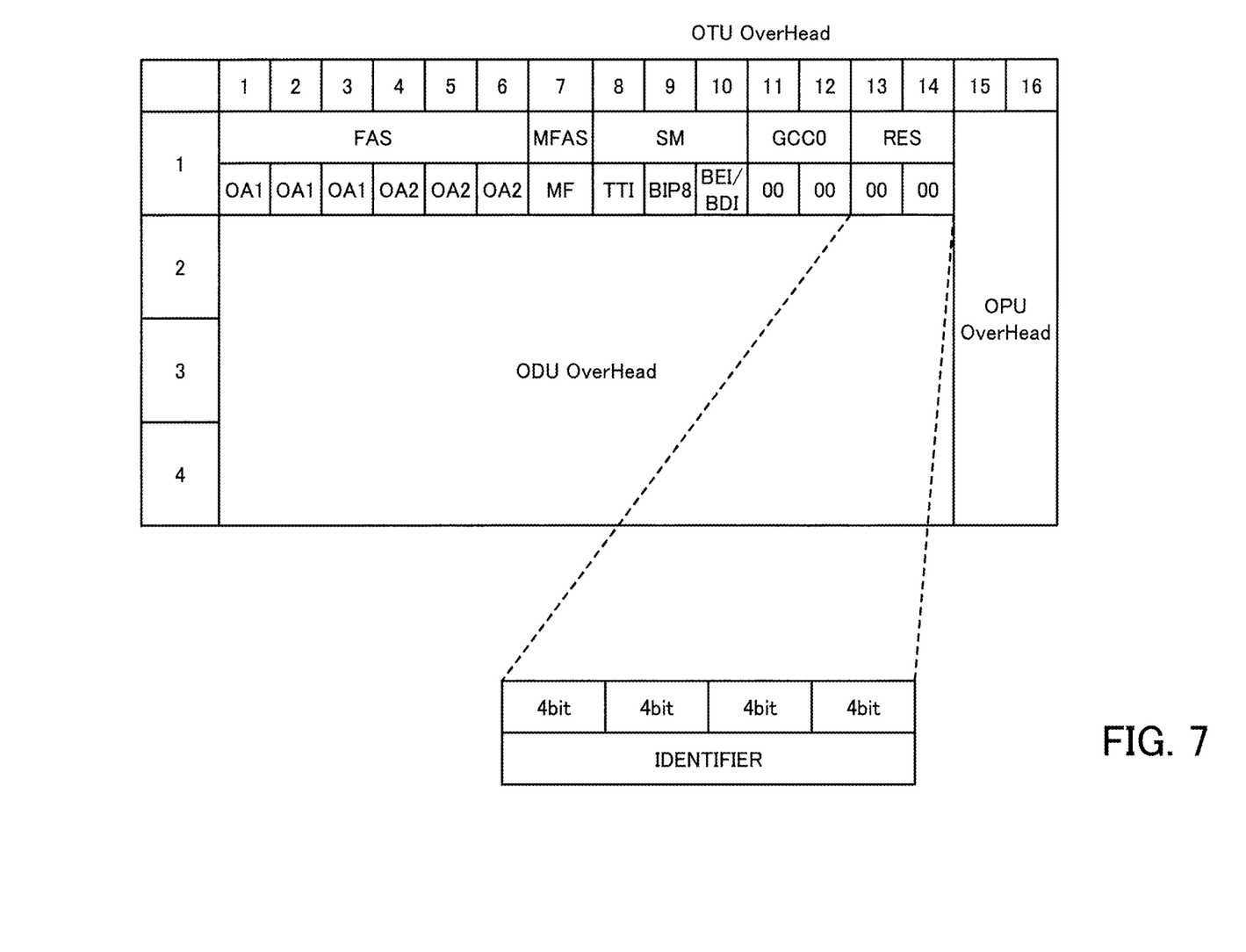
FIG. 7 is a diagram showing the format of an OTN frame in the second embodiment.

FIG. 7 is a diagram showing the format of the OTN frame in the second embodiment. A reserve area exists in the OTN frame. The reserve area includes the identifier.

The signal processing unit 150a extracts the identifier from the frame including the identifier. The signal processing unit 150a transmits the identifier to the control unit 180a. Here, for example, the identifier transmitted is referred to also as a first identifier.

The control unit 180a identifies the client type to be set to each of the client IF units 110_1 to 110_N based on the identifier.

Next, a process executed by the optical communication device 100a will be described below by using a flowchart.

Figure 8:
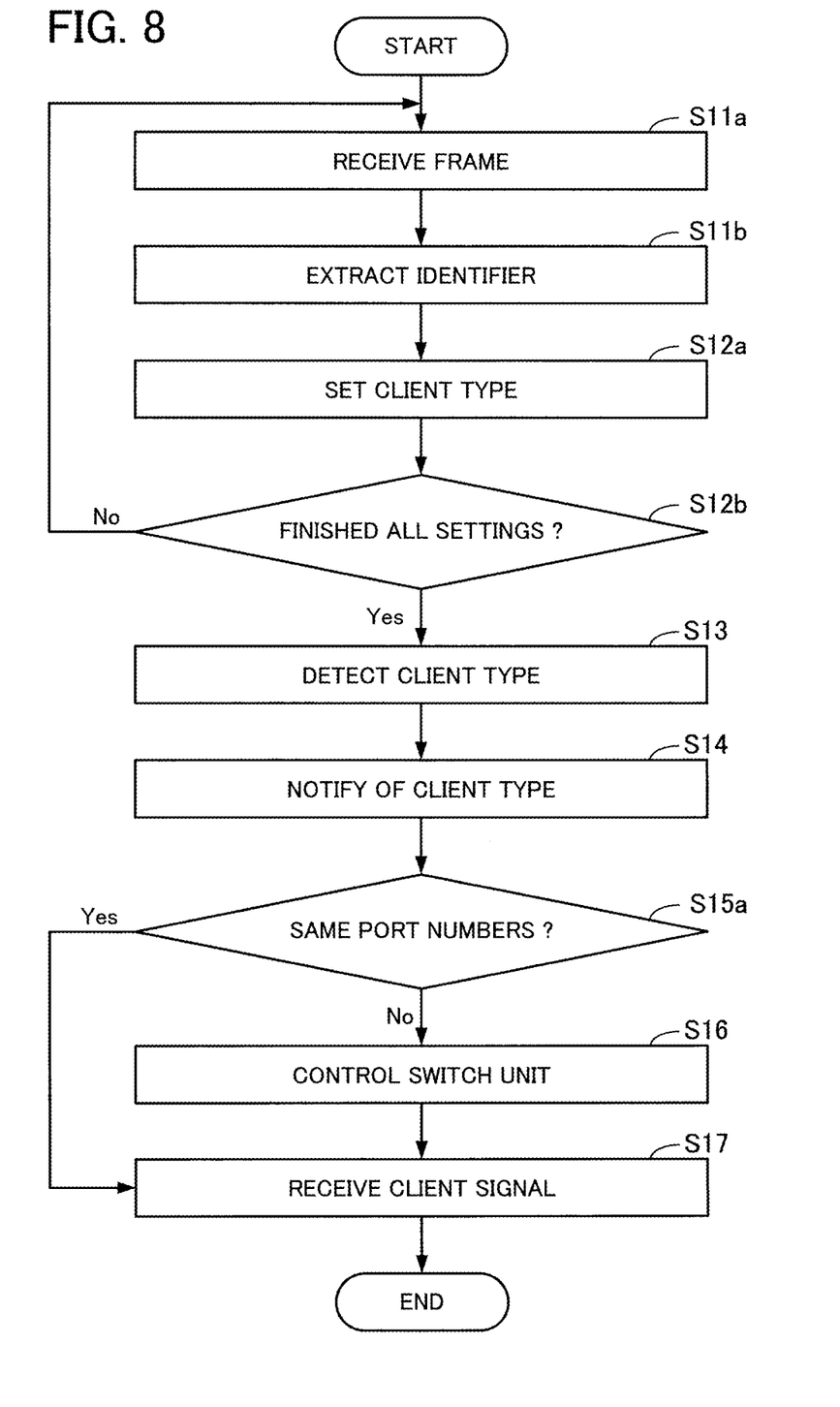
FIG. 8 is a flowchart showing an example of a process executed by the optical communication device in the second embodiment.

FIG. 8 is a flowchart showing an example of the process executed by the optical communication device in the second embodiment. In the description of the step S13 and the following steps, an example of a process executed by the signal detection unit 130_1 will be described. The signal detection units other than the signal detection unit 130_1 also execute the same process as the signal detection unit 130_1.

Here, the process of FIG. 8 differs from the process of FIG. 4 in executing steps S11a, S11b, S12a, S12b and S15a. Thus, the steps S11a, S11b, S12a, S12b and S15a will be described below with reference to FIG. 8. In regard to the other steps in FIG. 8, the description of the processing therein is left out by assigning them the same step numbers as in FIG. 4. Incidentally, the process executed by the control unit 180 in FIG. 4 is executed by the control unit 180a.

(Step S11a) The signal processing unit 150a receives a frame including an identifier from the WDM optical transmission reception unit 160.

(Step S11b) The signal processing unit 150a extracts the identifier from the frame including the identifier. The signal processing unit 150a transmits the identifier to the control unit 180a.

(Step S12a) The control unit 180a identifies the relationship between a port number of a client IF unit and a client type based on the identifier and the conversion table 191. In other words, the control unit 180a identifies the relationship between a client IF unit and a client type based on the identifier and the conversion table 191. The control unit 180a sets the identified client type to the identified client IF unit. For example, the control unit 180a sets the identified client type "1GbE" to the identified client IF unit 110_2.

(Step S12b) The control unit 180a judges whether or not the client types have been set to the client IF units 110_1 to 110_N. If the client types have been set to the client IF units 110_1 to 110_N, the process advances to the step S13. If there exists a client IF unit to which no client type has been set, the process advances to the step S11a.

(Step S15a) The control unit 180a judges whether the port number of the signal detection unit 130_1 and the port number to which the detected client type has been set are the same as each other or not based on the process executed in the step S12a.

If the port numbers are different from each other, the process advances to the step S16.

If the port numbers are the same as each other, the client signal (electric signal) inputted to the signal detection unit 130_1 is inputted to the client IF unit 110_1. The client IF unit 110_1 transmits the client signal (optical signal) obtained by the conversion of the client signal (electric signal) to the client device. When abnormality is detected in the communication of the client signal (optical signal), the client device transmits a client signal (optical signal) including the alarm information.

Then, the process advances to the step S17.

The description of the step S11a has been given of a case where one identifier is included in one frame. However, it is permissible even if information obtained by splitting one identifier is stored in a plurality of frames. Then, the signal processing unit 150a can acquire one identifier when the plurality of frames are received.

According to the second embodiment, it is possible to set a client type to each of the client IF units 110_1 to 110_N even if the optical communication device 100a is not connected to the monitoring control device 200. Further, the optical communication device 100a is capable of implementing the electrical continuity even if the optical communication device 100a is formed of products from different companies.

Features in the embodiments described above can be appropriately combined with each other.

DESCRIPTION OF REFERENCE CHARACTERS

100, 100a: optical communication device, 110, 110_1-110_N: client IF unit, 120: switch unit, 130, 130_1-130_N: signal detection unit, 131_1: detection unit, 132_1: alarm monitoring unit, 140: MUX/DEMUX unit, 150, 150a: signal processing unit, 160: WDM optical transmission reception unit, 170: acquisition unit, 180, 180a: control unit, 190: storage unit, 191: conversion table, 200: monitoring control device

What is claimed is:

1. An optical communication device comprising:
    a reception converting circuitry to receive an optical signal and convert the optical signal to an electric signal;
    a first converting circuitry to convert the electric signal obtained by the conversion by the reception converting circuitry to a plurality of electric signals;
    a plurality of signal detecting circuitries;
    a switch to change paths;
    a plurality of interfaces; and
    a controlling circuitry, wherein
    each of the plurality of interfaces executes a process based on a communication standard having been set,
    a first signal detecting circuitry among the plurality of signal detecting circuitries detects a first electric signal among the plurality of electric signals, and
    when the first electric signal is a signal to be processed based on a first communication standard, the controlling circuitry controls the switch so that the first electric signal is inputted to a first interface that executes a process based on the first communication standard among the plurality of interfaces.

2. The optical communication device according to claim 1, wherein the plurality of interfaces convert input electric signals to optical signals.

3. The optical communication device according to claim 1, further comprising a signal processing circuitry to perform a predetermined process on the electric signal obtained by the conversion by the reception converting circuitry.

4. The optical communication device according to claim 3, further comprising a memory to store conversion information as information for identifying relationship between the first interface and the first communication standard by using a first identifier, wherein
    the first identifier is included in the electric signal obtained by the conversion by the reception converting circuitry,
    the signal processing circuitry extracts the first identifier from the electric signal obtained by the conversion by the reception converting circuitry, and
    the controlling circuitry identifies the relationship between the first interface and the first communication standard based on the first identifier and the conversion information and sets the first communication standard to the first interface.

5. The optical communication device according to claim 1, further comprising an acquiring circuitry to acquire setting information indicating a communication standard to be set to each of the plurality of interfaces, wherein
    the setting information indicates that the first communication standard is to be set to the first interface, and
    the controlling circuitry sets a communication standard to each of the plurality of interfaces based on the setting information, and when the first electric signal is a signal to be processed based on the first communication standard, controls the switch so that the first electric signal is inputted to the first interface based on the setting information.

* * * * *